United States Patent [19]
Bellovin et al.

[11] Patent Number: 5,805,820
[45] Date of Patent: Sep. 8, 1998

[54] METHOD AND APPARATUS FOR RESTRICTING ACCESS TO PRIVATE INFORMATION IN DOMAIN NAME SYSTEMS BY REDIRECTING QUERY REQUESTS

[75] Inventors: Steven Michael Bellovin, Westfield; William Roberts Cheswick, Bernardsville, both of N.J.

[73] Assignee: AT&T Corp., Middletown, N.J.

[21] Appl. No.: 679,466

[22] Filed: Jul. 15, 1996

[51] Int. Cl.⁶ .................................................. G06F 15/163
[52] U.S. Cl. ........................ 395/200.55; 707/9; 707/10; 395/187.01; 395/188.01; 395/200.59
[58] Field of Search ................... 707/9, 10; 395/187.01, 395/188.01, 200.33, 200.48, 200.55, 200.59

[56] References Cited

U.S. PATENT DOCUMENTS

| | | | |
|---|---|---|---|
| 5,204,961 | 4/1993 | Barlow | 395/725 |
| 5,416,842 | 5/1995 | Aziz | 380/30 |
| 5,519,858 | 5/1996 | Walton et al. | 395/600 |
| 5,548,649 | 8/1996 | Jacobson | 380/49 |
| 5,550,984 | 8/1996 | Gelb | 395/200.17 |
| 5,586,260 | 12/1996 | Hu | 395/200.2 |
| 5,606,668 | 2/1997 | Schwed | 395/200.11 |
| 5,614,927 | 3/1997 | Gifford et al. | 707/101 |
| 5,623,601 | 4/1997 | Vu | 395/187.01 |
| 5,655,077 | 8/1997 | Jones et al. | 395/187.01 |
| 5,664,185 | 9/1997 | Landfield et al. | 707/104 |

OTHER PUBLICATIONS

Greenwald et al., "designing an academic firewall: policy, practice, and experience with SURF", Network and Distributed system security symposium, IEEE, pp. 79–92, 1996.

Primary Examiner—Thomas G. Black
Assistant Examiner—Jean R. Homere

[57] ABSTRACT

A device and method redirect query requests to restrict access to private information of a domain in a domain name system. The device includes a switching device that redirects query requests for the private information from within the domain to a device within the domain. The private information includes IP addresses and domain names. All the devices in the domain may be modified to direct all query requests to the switching device or the switching device may be incorporated into a firewall of the domain.

20 Claims, 7 Drawing Sheets

METHOD AND APPARATUS FOR RESTRICTING ACCESS TO PRIVATE INFORMATION IN DOMAIN NAME SYSTEMS BY REDIRECTING QUERY REQUESTS

This Application is related to U.S. patent application entitled "A METHOD AND APPARATUS FOR RESTRICTING ACCESS TO PRIVATE INFORMATION IN DOMAIN NAME SYSTEMS BY FILTERING INFORMATION", Ser. No. 08/683,019 filed on even date herewith by the same inventors under common assignee.

BACKGROUND OF THE INVENTION

1. Field of the Invention

This invention relates to restricting access to private information in domain name systems.

2. Description of Related Art

Many distributive systems assign names in the distributive system by a hierarchial naming scheme known as domain names. Distributive systems using domain names are called Domain Name Systems (DNSs). A domain name is a sequence of domain names separated by periods. For example, research.att.com is a domain name. Com is a top level domain name of a top level domain, att is a second level domain name of a second level domain and research is a third level domain name of a third level domain. A device in a domain is labeled by the name of the device followed by the domain name. Thus, a device labeled "server" in the research.att.com domain has the name, server.research.att.com. A device name is also referred to as a domain name.

While domain names partition a distributive system in a logical and hierarchial manner, messages are transferred between devices of the DNS by identifying devices using IP addresses. IP addresses are 32-bit numbers that are expressed as four 8-bit values separated by periods such as 191.192.193.2. IP addresses contain information such as network ID of a device network connection and a device ID. The IP address are assigned by an address authority. The addresses are assigned in blocks to authoritative address servers.

The IP addresses relate to each other also in a hierarchical manner, however, the domain name hierarchy and the IP address hierarchy are not directly related to each other. While some name servers are also address servers, name and address servers do not have to be the same device. Thus, it is possible for a server to have authority to resolve a domain name into a corresponding IP address of a device, the same name server may not be able to resolve the IP address to the corresponding domain name of the same device. Thus, resolution of IP addresses to domain names follows a similar process as resolving domain names to IP addresses except different servers may be involved.

Because IP addresses are numerical and, unlike a domain name, are assigned without regard to the logical and hierarchial organization of the DNS, domain names are generally used in instructions for functions such as data transfers. Thus, a data transfer instruction identifies the receiving device by its domain name. However, the domain name must be translated into a corresponding IP address before the data transfer can occur.

Domain names are managed by authoritative devices called name servers. Name servers translate domain names into corresponding IP addresses and vice-versa. When a first device desires to transfer a message to a second device known only by its domain name, the first device must query a name server to acquire the corresponding IP address to the known domain name of the second device.

Because of the potentially large volume of IP address query requests which may significantly reduce the efficiency of the DNS, many schemes have been implemented to reduce the workload of name servers and associated network traffic. However, while these schemes improve the efficiency of the DNS, they also introduce opportunities for unauthorized activities such as gaining unauthorized access to information private to a domain or login into private machines. Thus, there is a need to restricted access to private information within a DNS.

SUMMARY OF THE INVENTION

An intruder gains access to information private to a domain by taking advantage of the domain name resolution process used by DNSs. Because instructions for functions such as data transfers use domain names to specify destination devices, the domain names must be translated (resolved) into IP addresses before a data transfer can occur. The intruder takes advantage of the process for resolving domain names into IP addresses to gain access to private information. In particular, the intruder passes corrupted IP addresses and/or domain names to a target domain so that normal name resolutions produces the IP address of the intruder's device instead of an intended destination device.

The invention prevents the intruder from gaining access to private information of a domain by removing any possibility for a device within the domain to receive private information from a device external to the domain. In particular, the invention provides a DNS proxy device that performs a switching function.

The switching function receives query requests for domain name resolutions from devices within the domain and redirects any requests for domain names or IP addresses of devices within the domain to another device within the domain such as a name server. All requests for information not private to the domain is forwarded to the destination device external to the domain.

Specifically, the invention provides a system in a DNS that restricts access to private information of a first domain. The system includes a switching device. The switching device receives all requests for information from the first domain and redirects a request for private information to authoritative sources for the private information in the first domain. All requests directed to devices in the second domain for information that is not private, are transferred to the devices in the second domain.

BRIEF DESCRIPTION OF THE DRAWINGS

The invention is described in detail with reference to the following drawings, wherein like numerals represent like elements.

DETAILED DESCRIPTION OF PREFERRED EMBODIMENTS

Figure 1:
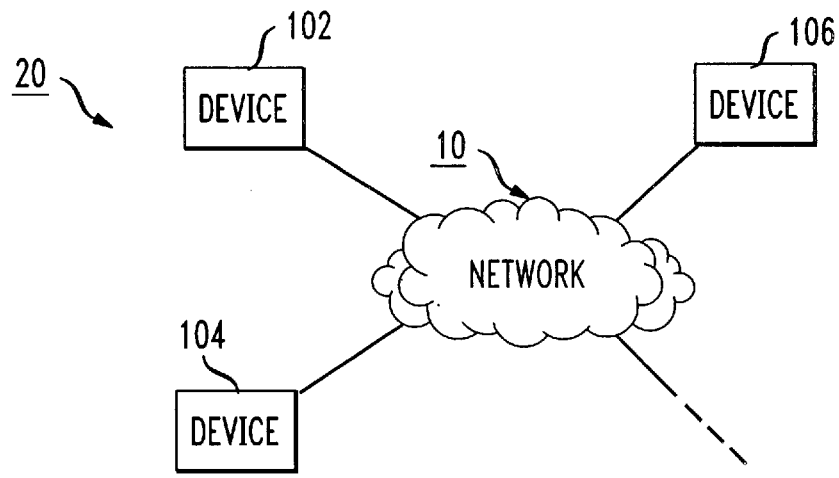
FIG. 1 is a block diagram of a distributive system.
Figure 2:
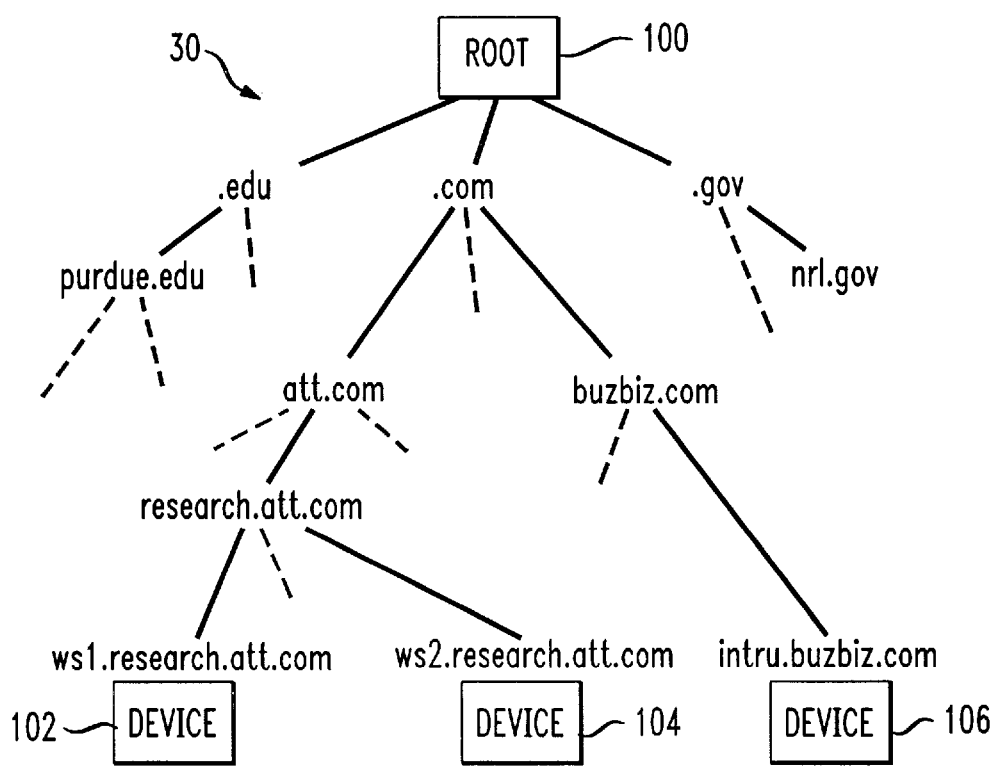
FIG. 2 is a diagram showing a hierarchy of domain names.

FIG. 1 shows a physical connection for a distributive system 20 including network 10 and devices 102, 104 and 106. The distributive system 20 may be organized as a domain name system (DNS) 30 as shown in FIG. 2.

The DNS 30 has a root 100 that holds the highest level authority for domain names in the DNS 30. The root may assign domain names such as edu, com and gov representing educational institutions, commercial institutions and government institutions, respectively. Each of these domains may be further divided into other domains such as purdue.edu, att.com and nrl.gov. The root 100 may delegate name authority for domains to other devices called authoritative name servers. For example, the domain att.com may be owned and controlled by AT&T Corp. AT&T Corp. may designate devices to be authoritative name servers which has authority to assign and manage names within the att.com domain. Thus, the complete DNS 30 may be divided into a plurality of domains in which the naming authority in each domain is vested in authoritative name servers of that domain.

Authoritative name servers may delegate its name authority to yet other servers within its domain. For example, the att.com domain may have a device named server.att.com as an authoritative name server that has authority for domain names under att.com. Att.com may have a subdomain called research.att.com and server.att.com may delegate the name authority for the research.att.com subdomain to a device named server.research.att.com. Subdomains are also called domains. Thus, server.research.att.com has name authority for device names in the research.att.com domain such as ws1.research.att.com for device 102 and ws2.research.att.com for device 104.

Server.buzbiz.com may be an authoritative name server for the buzbiz.com domain. The buzbiz.com domain may contain a device such as device 106 having the name intru.buzbiz.com.

Figure 3:
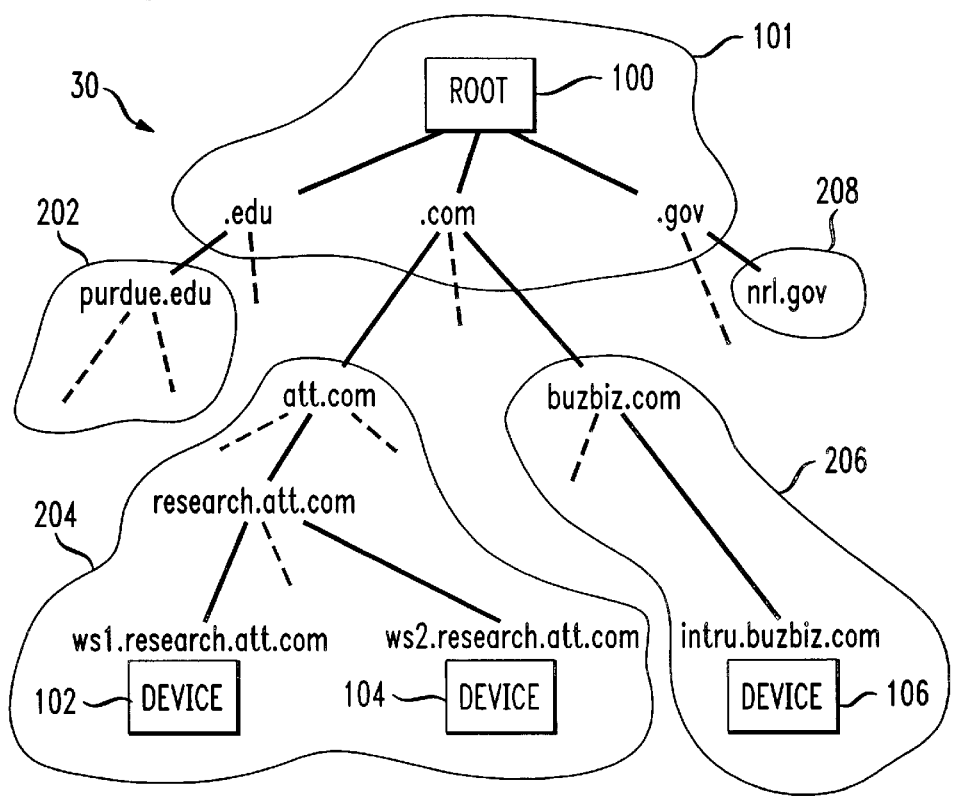
FIG. 3 shows a diagram of hierarchial domain names separated into domains.

FIG. 3 shows the DNS 30 divided into domains purdue.edu 202, att.com 204, buzbiz.com 206, nrl.gov 208 and root 210. The root domain 101 is shown to include domains edu, con and gov. The domains edu, com and gov may be delegated by the root name server 100 to other authoritative name servers, however, in this case, a single name server, root 100, retains the authority for domains edu, com and gov.

Figure 4:
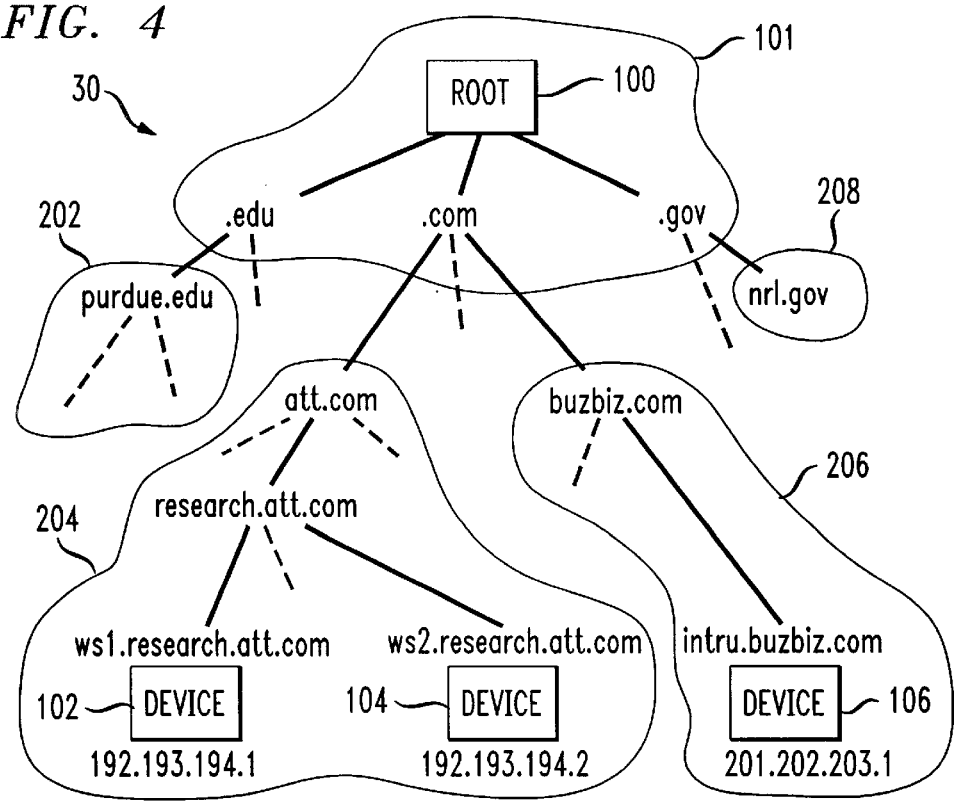
FIG. 4 is a diagram of the domains of FIG. 3 with devices having IP addresses.

As discussed earlier, data is transferred among the devices 102, 104 and 106 in the DNS 30 by using IP addresses. FIG. 4 shows the IP addresses of devices 102, 104 and 106. In order to transfer data from device 106 to device 102, device 106 must specify 192.193.194.1 as the destination IP address.

Figure 5:
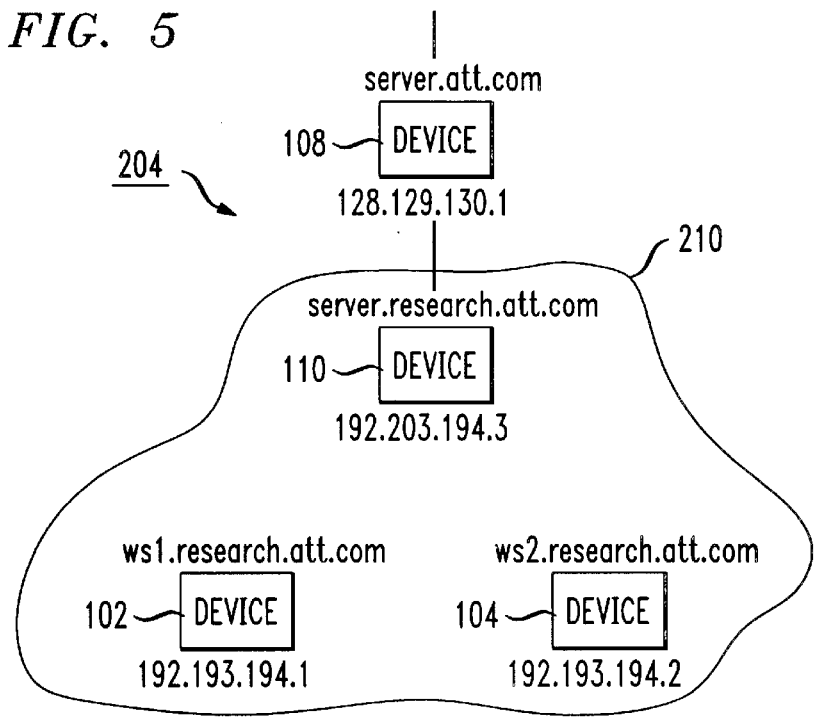
FIG. 5 is a diagram of a domain having devices with corresponding IP addresses.

Every device in the DNS 30 has at least one IP address. As shown in FIG. 5, the domain 204 includes devices 102, 104, 108 and 110. Each of the above devices has a domain name and an IP address. Server.research.att.com is the name of the device 110 having the IP address of 192.203.194.3 and server.research.att.com is an authoritative name server for the research.att.com domain 210. The research.att.com domain 210 includes devices 102 and 104 having IP addresses 192.193.194.1 and 192.193.194.2, respectively.

Because each device in the DNS 30 has a domain name and an IP address, two translation tables can be constructed, for example, see Table 1 and Table 2 below. Table 1 of domain names has for each domain name a corresponding IP address and Table 2 of IP addresses has for each IP address a corresponding domain name. If Table 1 is sorted by the domain name and Table 2 is sorted by the IP addresses, Table 1 may be used to quickly determine the IP address for a domain name and Table 2 may be used to quickly determine the domain name for an IP address. Each name server contains tables corresponding to Table 1 and Table 2 for all the devices for which it has name authority. Because authoritative name servers contain this information, other devices send get-address and get-name requests to the authoritative name servers to provide IP addresses of domain names and domain names of IP addresses, respectively, under its authority.

TABLE 1

| att.com | 128.129.130.1 |
| research.att.com | 192.203.194.3 |
| ws1.research.att.com | 192.193.194.1 |
| ws2.research.att.com | 192.193.194.2 |

TABLE 2

| 128.129.130.1 | att.com |
| 192.193.194.1 | ws1.research.att.com |
| 192.193.194.2 | ws2.research.att.com |
| 192.203.194.3 | research.att.com |

When a first device receives an instruction to send data to a second device known by its domain name, the first device sends a query request to an authoritative name server of the second device for the IP address of the second device. The authoritative name server either returns the requested information or if the name authority has been delegated, the authoritative name server returns the name of another authoritative name server that has the information. After obtaining the IP address, the first device incorporates the IP address into a message containing the data and sends the message to the second device.

Not all name servers have name authority. Sometimes file servers retain domain names and IP addresses so that devices local to the file servers can gain easy access to names of other local devices. These file servers are also called name servers or resolvers for resolving domain names with IP addresses and vice-versa.

If a name server (authoritative or non-authoritative) forwards an IP address not known by the name server, the IP address is also stored in the name server's cache memory as a resource record for future resolution of the same domain name. Thus, authoritative name servers also accumulate IP addresses and corresponding domain names to facilitate efficient resolution of domain names to IP addresses and vice-versa. Thus, authoritative name servers are also referred to as resolvers for resolving domain names.

In a further effort to improve the efficiency of the DNS 30, name servers often pass on "additional information" such as IP addresses of other related devices and their domain names by appending the additional information to query request responses. Resolvers receive and store the additional information in the cache memories for future address resolutions.

Figure 6:
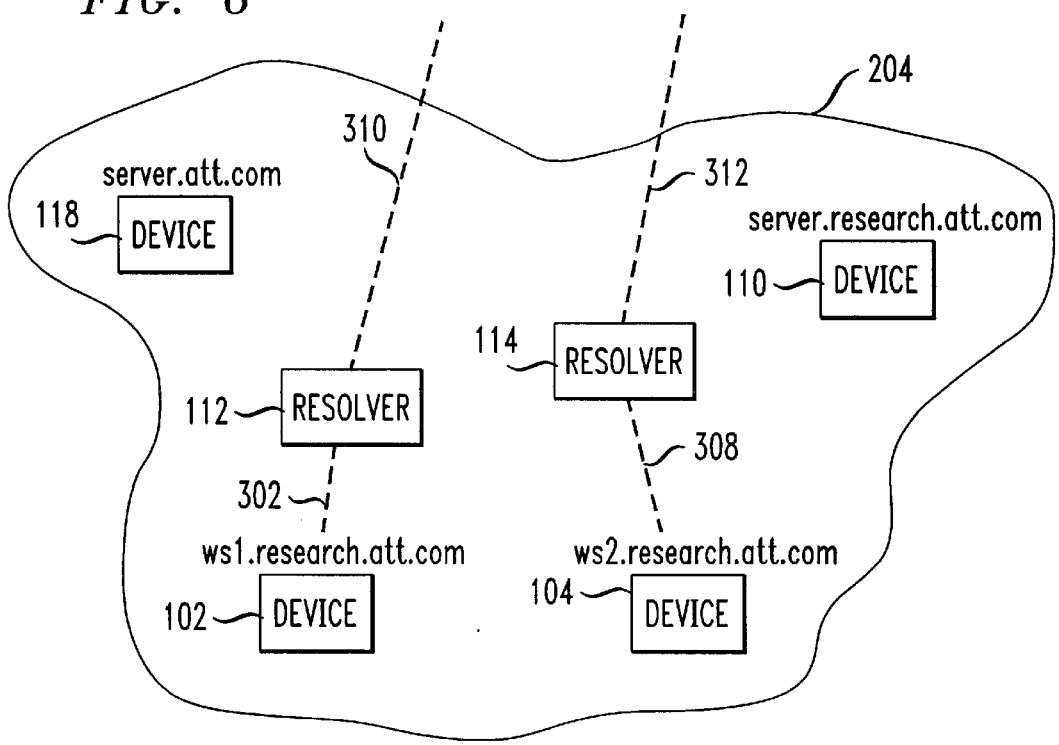
FIG. 6 is a diagram of the domain of FIG. 5 having devices that communicate with each other and with devices outside of the domain.

FIG. 6 shows that the domain 204 further includes resolvers 112 and 114. Devices 102 and 104 send query requests to resolvers 112 and 114 via communication lines 302 and 308 respectively to resolve domain names into IP addresses. The resolvers 112 and 114 are physically located close to the devices 102 and 104, respectively. For example, the resolvers 112 and 114 may be on the same LAN or closely connected in a single building to the devices 102 and 104, respectively. Thus, address resolution required by the devices 102 and 104 may be performed without any network traffic beyond local LAN connections.

However, when the resolvers 112 and 114 resolves domain names by receiving IP addresses not obtained from an authoritative source, the IP addresses are offered to the querying device as not authoritative. Many times the querying device decides to use the IP address anyway because the DNS 30 in general does not change that quickly.

The DNS 30 changes because machines are added, moved or removed, for example. In this dynamic situation, each of the resource records includes a time-to-live field that indicates the lifetime of each resource record. The resolvers 112 and 114 discard resource records periodically when the time-to-live value of the resource records expire. The time-to-live values are set by the name server that has authority over the contents of the resource record such as the IP address.

As discussed earlier, att.com may be a domain owned and controlled by the AT&T Corp. Thus, all the devices controlled by the AT&T Corp. are within the att.com domain. The AT&T Corp. may distribute the devices in the att.com domain in sites which are physically distant from each other. For example, device 102 and resolver 112, may be located in one site and device 104 and resolver 114 may be located at another site. The communication paths 302, 304 and 308 represent intercommunication between devices within the att.com domain even though communication path 304 is between geographically two distant locations. Communication paths 310 and 312 represent communication paths between the resolvers 112 and 114 within the att.com domain and devices of other domains.

Because information being exchanged within the att.com domain may be valuable to the AT&T Corp., there is great interest to protect the information deemed private to att.com from unauthorized access. Private information of a domain is information that describes something about that domain. The authority to change the private information lies within the domain. For example, IP addresses and domain names are private information within the domain.

Figure 7:
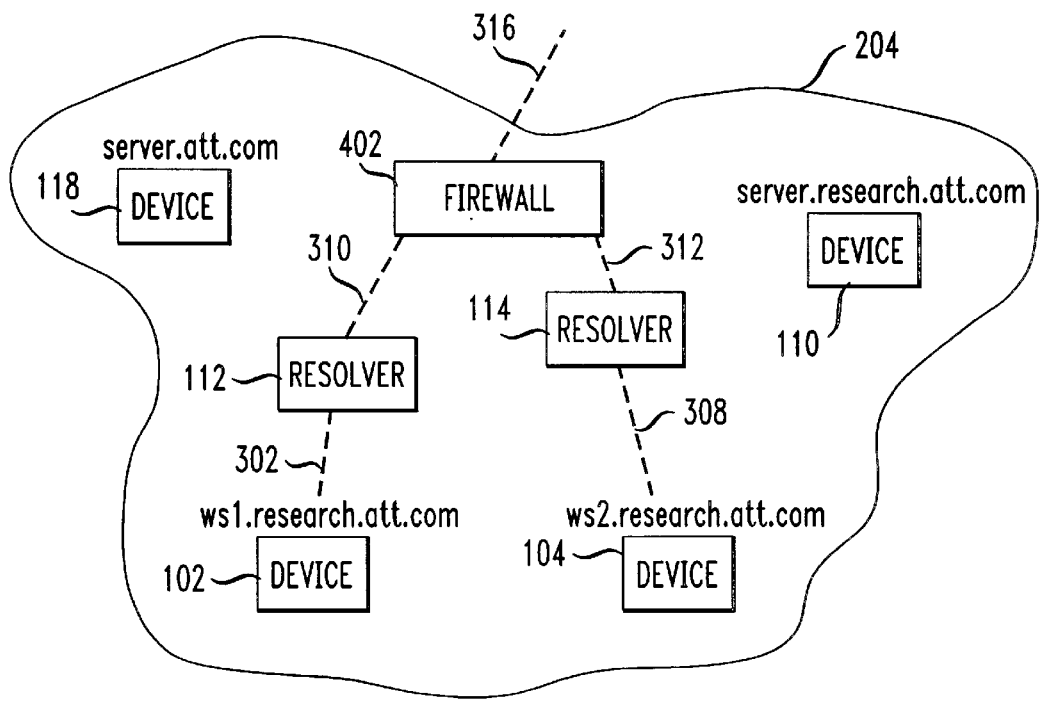
FIG. 7 is a diagram of the domain shown in FIG. 6 having a firewall.

Devices such as a firewall 402, as shown in FIG. 7, is installed to control data transfers in and out of the domain 204. Communication paths 310 and 312 pass through the firewall 402 before reaching devices outside the domain 204 through communication line 316. The firewall 402 prevents unauthorized transfer of private information out of the domain 204 and denies requests from devices external to the domain 204 for information that is private to the domain 204.

However, some conventional firewalls fail to prevent access to private information that are obtained indirectly by exploiting name resolution methods used by domain name systems such as DNS 30. In particular, the process by which domain names are resolved into the corresponding IP addresses may be exploited by one of several methods. Some of these methods are explained below by way of examples.

For the purposes of the following examples, it is assumed that an intruder has identified a target device, a user name to impersonate and a device trusted by the target device so that a password is not necessary for the trusted device to login to the target device. The intruder may be able to identify target devices from mail messages or news articles. Once the target device is identified, the intruder may use standard services such as simple network management protocol (SNMP) to examine the target device to discover other devices that are connected to the target device. In addition, services such as "finger" provides personal information about either an individual user or other user's logged onto a system. Moreover, mail headers often indicate the name of a file server that is an apparent sender of the mail and the name of the actual device that originated the mail which typically is the name of a workstation. In general, file servers and workstations served by the file server communicate without using passwords. Thus, the intruder may obtain all the required information using standard available services.

Assuming that the intruder has control of a legitimate name server such as intru.buzbiz.com in the buzbiz.com domain, the intruder has the ability to modify any of the files in intru.buzbiz.com. If the intruder has identified ws1.research.att.com as a target and has also identified ws2.research.att.com as a device trusted by ws1.research.att.com, then the intruder may modify the translation table, similar to Table 2, used to convert IP addresses to corresponding domain names so that the IP address of intru.buzbiz.com (201.202.203.1) corresponds to the domain name ws2.research.att.com. After modifying the translation table, the intruder then attempts to login to ws1.research.att.com as a trusted device using an rlogin procedure and providing 201.202.203.1 as the IP address of ws2.research.att.com.

After receiving the rlogin request, ws1.research.att.com executes a get-name request for the IP address 201.202.203.1 to obtain the corresponding domain name. The get-name request is eventually routed to intru.buzbiz.com because intru.buzbiz.com is the authoritative address server for the 201.202.203.1 IP address and has the table to convert 201.202.203.1 to its corresponding domain name. However, because the table has been modified to output ws2.research.att.com instead of intru.buzbiz.com in response to a get-name request for IP address 201.202.203.1, the erroneous domain name of ws2. research.att.com is returned. Thus, ws1.research.att.com receives ws2.research.att.com as the domain name of the device corresponding to the rlogin request. Since ws2.research.att.com is a trusted machine, ws1.research.att.com accepts the rlogin request and permits the intruder to login to ws1.research.att.com. Accordingly, the intruder gains access to all the private information reachable from within ws1.research.att.com.

Another technique for gaining unauthorized access to private information is to poison the cache memory of a resolver such as resolver 112. Assuming that the intruder has identified ws1.research.att.com as a target, the intruder by various methods induces ws1.research.att.com to query intru.buzbiz.com for information. Ws1.research.att.com sends a get-address request to resolver 112 to obtain the IP address of the intruding device intru.buzbiz.com. Since the resolver 112 does not have any information regarding intru.buzbiz.com, it outputs a get-address request to a name server for intru.buzbiz.com, which in this case is intru.buzbiz.com itself. Intru.buzbiz.com returns the requested IP address but appends additional information which indicates that the IP address of ws2.research.att.com is associated with IP address 201.202.203.1 instead of the legitimate IP address 192.193.194.2. The intruder sets a very short time-to-live for the additional information so that the resolver 112 will erase the corrupted resource record soon after the intruder completes the unauthorized access. The resolver accepts the response from intru.buzbiz.com and, as discussed earlier, enters the IP address for intru.buzbiz.com into its cache as well as the corrupted IP address 201.202.203.1 for ws2.research.att.com. Thus, the cache memory of resolver 112 is poisoned with the corrupted IP address for ws2.research.att.com.

Subsequently, intru.buzbiz.com logins to ws1.research.att.com using 201.202.203.1 as the IP address. When ws1.research.att.com executes a get-name instruction, the resolver 112 returns ws2.research.att.com based on the information in its poisoned cache. Ws1.research.att.com then grants the rlogin request by the intruder because ws2.research.att.com is a trusted device. Then, because the short time-to-live of the resource record for the corrupted IP address expires, the resolver 112 discards the resource record erasing any trace of the intrusion. Thus, the intruder has again successfully gained access to all the private information from within ws1.research.att.com.

The intruder is not restricted to using the rlogin procedure as discussed above. For example, once the corrupted IP address is accepted by the resolver 112 or ws1.research.att.com, the intruder may choose to intercept any messages sent by ws1.research.att.com to ws2.research.att.com. The interception is possible because the resolver 112 returns to ws1.research.att.com the IP address corresponding intru.buzbiz.com instead of the IP address of ws2.research.att.com. After receiving the outputs of ws1.research.att.com intended for ws2.research.att.com, the intruder may forward the data to ws2.research.att.com so that the communication between ws1.research.att.com and ws2.research.att.com continues without being modified. Thus the intruder may intercept private information such as passwords with little chance of being detected.

The unauthorized access to private information by the intruder described above is achieved because devices within the domain 204 receives an IP address of other devices in the domain 204 from an unreliable source external to the domain 204. The present invention prevents corrupted private information such as IP addresses from entering a domain by preventing two types of communications from occurring as discussed below.

Figure 8:
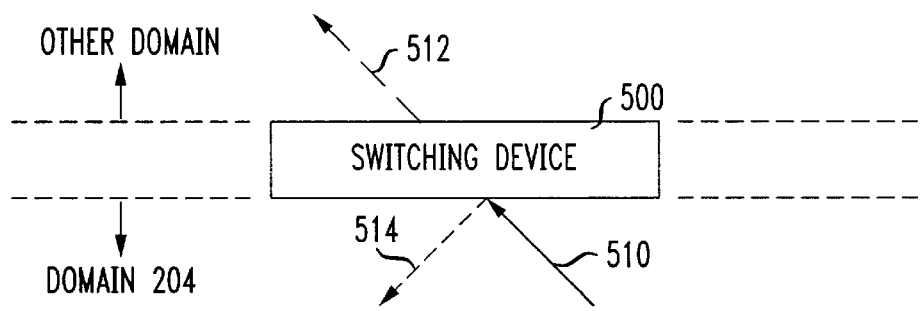
FIG. 8 is a diagram of a switching device.

1) The invention prevents a device from within a domain from requesting private information from a device external to the domain. As shown in FIG. 8, a switching device 500 receives queries 510 of get-name or get-address requests. The switching device 500 searches the contents of each request and any request for names or IP addresses of devices within the domain 204 is redirected to a name server internal to the domain 204 as redirected requests 514. Requests for names or IP addresses of devices outside of the domain 204 is forwarded to the appropriate name server external to the domain 204 as forwarded requests 512.

2) The invention provides a filter device that prevents private information from entering the domain from an unreliable source external to the domain. The filter device filters out all private information provided by devices external the domain.

Figure 9:
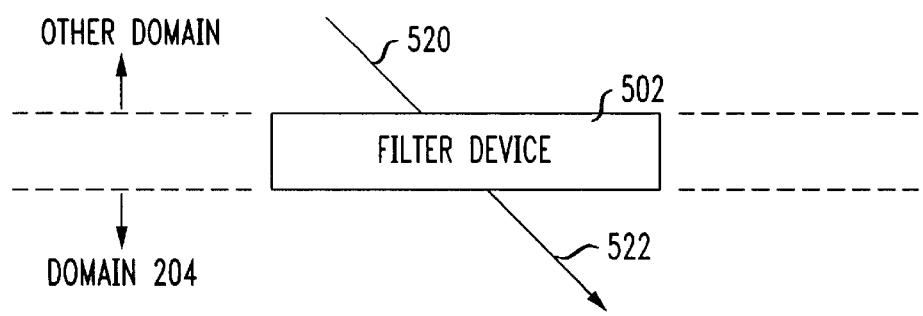
FIG. 9 is a diagram of a filtering device.

As shown in FIG. 9, the filter device 502 receives messages 520 from devices external to the domain 204. The filter device 502 examines the received messages 520 for any information that is private to domain 204 such as IP addresses and domain names and deletes the private information from the messages. Then the filtered messages 522 are forwarded to the destination devices in domain 204.

Figure 10:
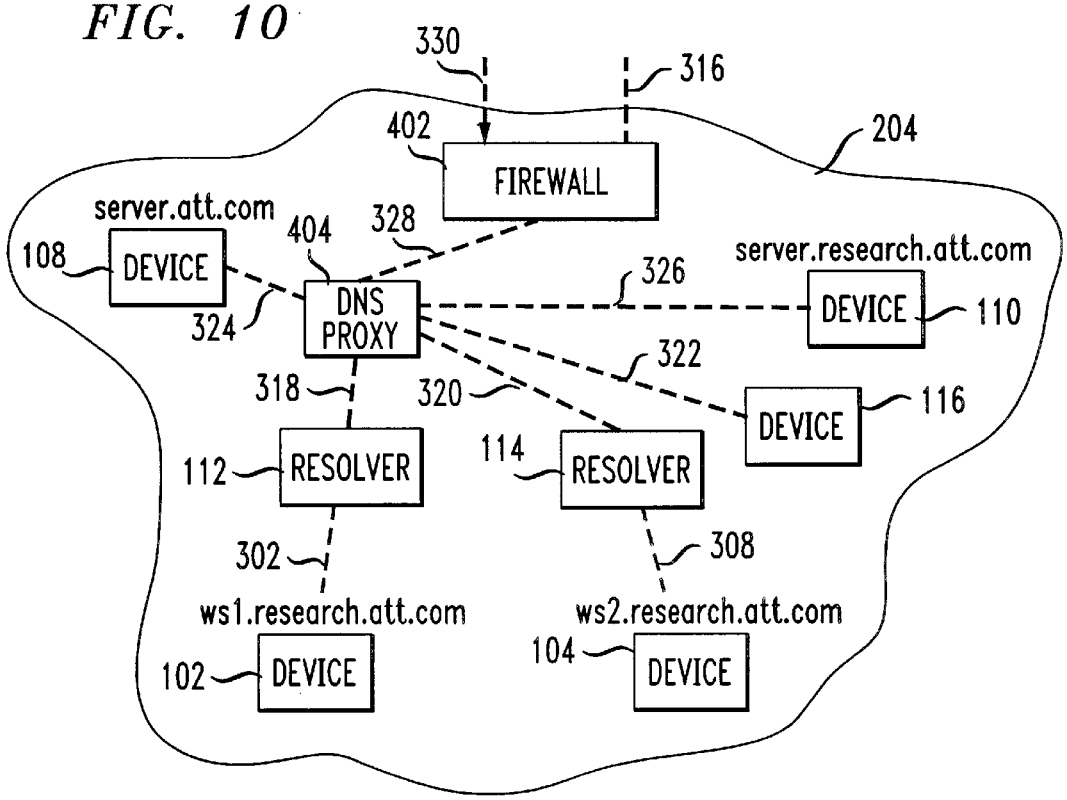
FIG. 10 is a diagram of a domain including a DNS proxy device.

FIG. 10 shows that the domain 204 includes a DNS proxy device 404. The DNS proxy 404 performs the switching and filtering functions described above. In this embodiment, the devices within the domain 204 are modified to direct all queries to the DNS proxy 404. The DNS proxy 404 examines all query requests from devices in the domain 204 and separates requests for information private to the domain 204 and requests for other information. Requests for private information are redirected to name servers within the domain 204 such as server.att.com and server.research.att.com. Queries for information other than private information are forwarded to the firewall 402 through communication path 328 which in turn forwards the request to external sources through communication path 316.

The embodiment shown in FIG. 10 requires modification of the software of devices such as resolvers 112 and 114 and device 116 to redirect query requests to the DNS proxy 404 instead of an appropriate name server external to the domain 204. The device 116 is not a name server but has the ability to communicate with external sources directly through communication path 322. This embodiment redirects the communication paths 318, 320 and 322 to the DNS proxy 404.

Information received from external sources through communication path 330 is filtered by the DNS proxy 404. The DNS proxy 404 examines all the information entering domain 204 and filters out any information that is private to the domain 204 such as IP addresses of devices within the domain 204. The private information included in the information supplied by the external sources is deleted before the information is forwarded to the destination device within the domain 204. Thus any attempt to append corrupted IP addresses to legitimate responses to query requests are eliminated.

Information received from the external sources through communication path 330 may also be deleted or modified for local security administrative policies. For example, if the information received from the external sources include pointers to name servers outside of the domain 204 and the pointers must be deleted before forwarding the information to a destination device within the domain 204. Otherwise, devices within the domain 204 may attempt to contact these name servers directly without the intervention of the DNS proxy 404. Conversely, pointers to name servers within the domain 204 may be inserted into the information received from external sources so that future name or address queries internal to the domain 204 may be resolved directly, without the aid of the DNS proxy 404.

Also, information such as electronic mail exchange records received from the external sources may be modified to redirect outbound electronic mail to a logging device (not shown) within the domain 204 to maintain a log record. The log record provides additional information to assist the protection of private information within the domain 204.

Figure 11:
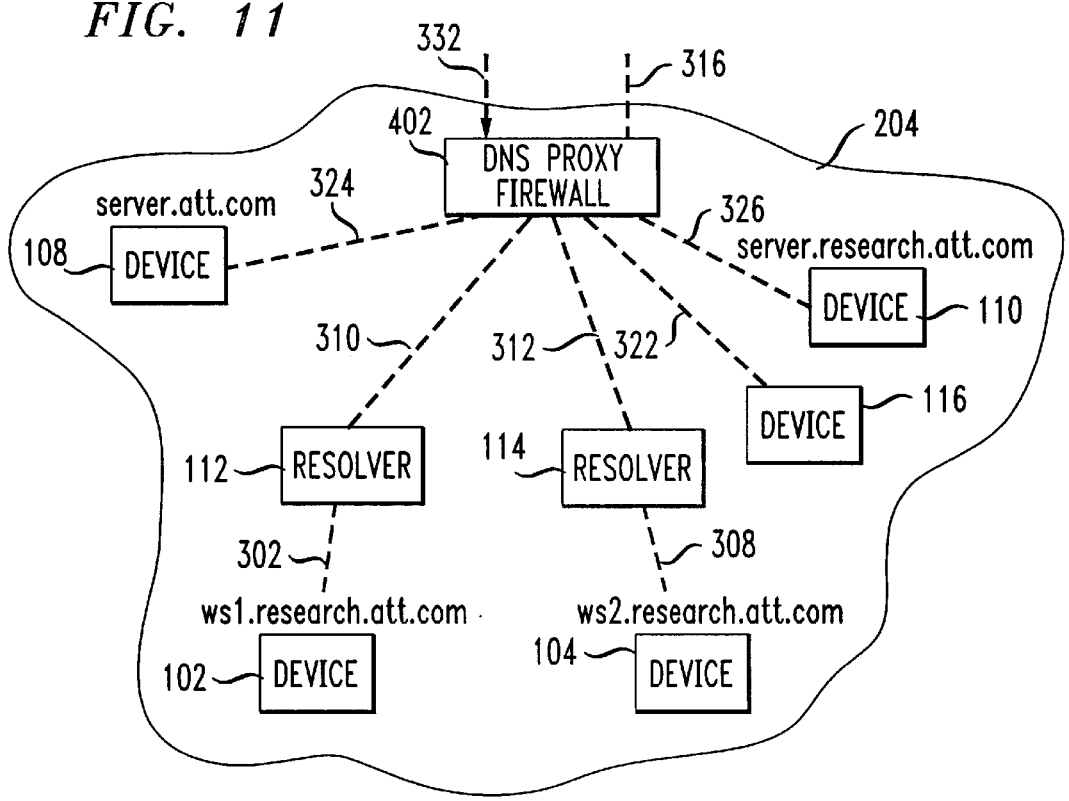
FIG. 11 is a diagram of a domain including a DNS proxy device incorporated in a firewall.

FIG. 11 shows that the DNS proxy 404 is incorporated into the firewall 402. In this embodiment, none of the programs of the devices within the domain 204 need to be modified. All the query requests continue to be directed to external sources through communication paths 310, 312 and 322. However, the DNS proxy within the firewall 402 switches all query requests for private information of the domain 204 to either server.att.com or server.research.att.com, for example, through communication paths 324 and 326, respectively. Information input from external sources through communication paths 322 are filtered to delete any private information before forwarding to the destination devices within the domain 204.

Figure 12:
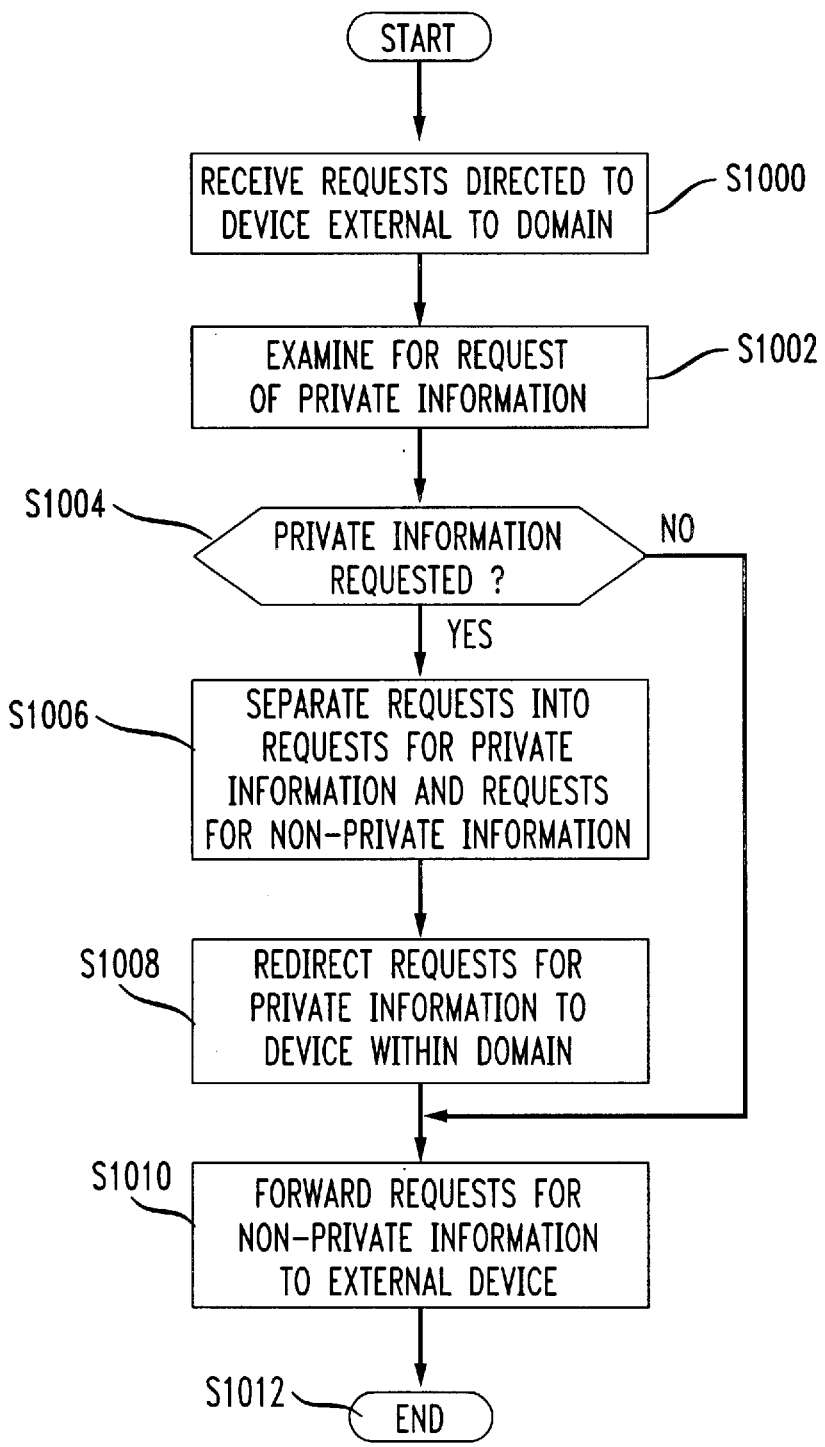
FIG. 12 is a flowchart of a process for the switching device.

FIG. 12 shows a process of the DNS proxy 404 performing the switching function. In step S1000, the DNS proxy 404 receives query requests directed to devices external to the domain 204 and goes to step S1002. In step S1002, the DNS proxy 404 examines each query request to determine if private information is being solicited from the devices external to the domain 204. Then the DNS proxy 404 goes to step S1004. In step S1004, the DNS proxy 404 goes to step S1006 if private information was requested; otherwise, the DNS proxy 404 goes to step S1010.

In step S1006, the DNS proxy 404 separates requests for private information of the domain 204 from requests for information not private to the domain 204. Then the DNS proxy 404 goes to step S1008. In step S1008, the DNS proxy 404 redirects all requests for private information to a device within the domain 204 such as a name server of the domain 204. Then the DNS proxy goes to step S1010.

In step S1010, the DNS proxy 404 forwards all requests for information not private to the domain 204 to the device external to the domain 204. Then the DNS proxy 404 goes to step S1012 and ends the process.

Figure 13:
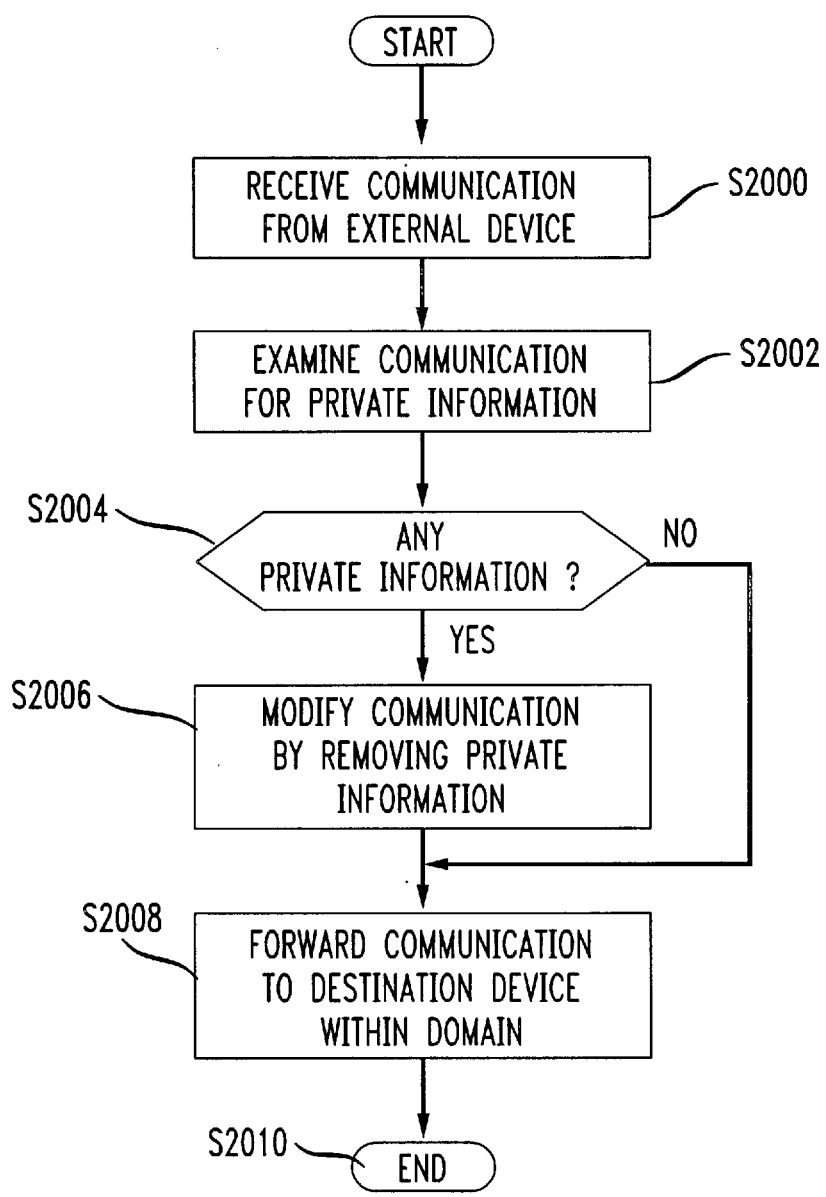
FIG. 13 is a flowchart for a process of the filtering device.

FIG. 13 shows the process of the DNS proxy 404 for filtering communication received from a device external to the domain 204. In step S2000, the DNS proxy 404 receives the communication from the external device and goes to step S2002. In S2002, the DNS proxy 404 examines the communication for private information and goes to step S2004. In step S2004, the DNS proxy 404 goes to step S2006 if private information was discovered in the communication from the external device; otherwise, the DNS proxy 404 goes to step S2008.

In step S2006, the DNS proxy 404 filters the communication by removing all private information from the communication and goes to step S2008. In step S2008, the DNS proxy 404 forwards the filtered communication to the destination device within the domain 204, goes to step S2010 and ends the process.

While this invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the inventions as defined in the following claims.

What is claimed is:

1. A subsystem in a domain name system that restricts access to private information of a first domain, the first domain being coupled to a second domain, the subsystem comprising:

a first device of the first domain; and a switching device coupled to the first device, the switching device receiving a communication from the first device of the first domain being directed to a device of the second domain, the communication including a first request for the private information of the first domain, the switching device redirecting the first request for the private information to a second device in the first domain.

2. The subsystem of claim 1, wherein the communication includes a second request for information that is not private information of the first domain, the switching device forwarding the second request to the device of the second domain.

3. The subsystem of claim 1, wherein the second device is a name server of the first domain.

4. The subsystem of claim 1, wherein the private information is at least one of a domain name of a device in the first domain and an IP address of the device in the first domain.

5. The subsystem of claim 1, wherein the first domain comprises a plurality of devices, the plurality of devices being modified to direct all communications with the second domain to the switching device.

6. The subsystem of claim 1, wherein the first device is one of a name server and a resolver, requests for information from devices in the first domain other than the first device being directed to the first device.

7. The subsystem of claim 1, wherein the switching device is part of a firewall of the first domain.

8. A method of operation of a subsystem in a domain name system for restricting access to private information of a first domain, the first domain being coupled to a second domain, the method comprising:

receiving a communication from a first device of the first domain that is directed to a device of the second domain, the communication including a first request for the private information of the first domain; and redirecting the first request for the private information of the first domain to a second device of the first domain.

9. The method of claim 8, further comprising:

forwarding a second request of the communication from the first device to the device of the second domain, the second request requesting information not private to the first domain.

10. The method of claim 8, wherein the second device is a name server of the first domain.

11. The method of claim 8, wherein the private information is at least one of a domain name and an IP address in the first domain.

12. An apparatus for use in a domain name system, comprising:

a first device of a first domain; and a switching device that receives a communication from the first device of the first domain, the communication including a first request for private information of the first domain, and being directed to a device of a second domain, the switching device redirecting the first request for the private information to a second device in the first domain.

13. The apparatus of claim 12, wherein the communication includes a second request for information that is not private information of the first domain, the switching device forwarding the second request to the device of the second domain.

14. The apparatus of claim 12, wherein the second device is a name server of the first domain.

15. The apparatus of claim 12, wherein the private information is at least one of a domain name of a device in the first domain and an IP address of the device in the first domain.

16. The apparatus of claim 12, wherein the switching device is part of a firewall of the first domain.

17. A method of operation of an apparatus in a domain name system for restricting access to private information of a first domain, the first domain being coupled to a second domain, the method comprising:

receiving a communication from a first device of the first domain that is directed to a device of the second domain, the communication including a first request for the private information of the first domain; and redirecting the first request for the private information of the first domain to a second device of the first domain.

18. The method of claim 17, further comprising:

forwarding a second request of the communication from the first device to the device of the second domain, the second request requesting information not private to the first domain.

19. The method of claim 17, wherein the second device is a name server of the first domain.

20. The method of claim 17, wherein the private information is at least one of a domain name and an IP address in the first domain.

* * * * *